US010302978B2

United States Patent
Yun

(10) Patent No.: US 10,302,978 B2
(45) Date of Patent: May 28, 2019

(54) LIQUID CRYSTAL DISPLAY PANEL AND DRIVING METHOD THEREOF

(71) Applicant: BOE TECHNOLOGY GROUP CO., LTD., Beijing (CN)

(72) Inventor: Saichang Yun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/329,886

(22) PCT Filed: Jun. 27, 2016

(86) PCT No.: PCT/CN2016/087271
§ 371 (c)(1),
(2) Date: Jan. 27, 2017

(87) PCT Pub. No.: WO2017/000854
PCT Pub. Date: Jan. 5, 2017

(65) Prior Publication Data
US 2017/0269412 A1    Sep. 21, 2017

(30) Foreign Application Priority Data

Jul. 1, 2015    (CN) .......................... 2015 1 0379431

(51) Int. Cl.
*G02F 1/133*    (2006.01)
*G02F 1/1343*    (2006.01)
(Continued)

(52) U.S. Cl.
CPC ...... *G02F 1/13306* (2013.01); *G02F 1/13452* (2013.01); *G02F 1/134309* (2013.01);
(Continued)

(58) Field of Classification Search
CPC .......... G02F 1/13306; G02F 1/134309; G02F 1/13452; G02F 1/136286; G02F 2201/121
(Continued)

(56) References Cited

U.S. PATENT DOCUMENTS 6,191,535 B1    2/2001  Saitou
6,333,729 B1 *  12/2001 Ha ....................... G09G 3/3688
                                                          345/100
(Continued)

FOREIGN PATENT DOCUMENTS

CN    101034527 A    9/2007
CN    100414575 C    8/2008
(Continued)

OTHER PUBLICATIONS

First Office Action dated Dec. 5, 2016 corresponding to Chinese application No. 201510379431.8.
(Continued)

*Primary Examiner* — Mark W Regn
(74) *Attorney, Agent, or Firm* — Nath, Goldberg & Meyer; Joshua B. Goldberg; Tanya E. Harkins

(57) ABSTRACT

The present disclosure provides a liquid crystal display panel and a driving method thereof. The liquid crystal display panel includes a common electrode, a plurality of common electrode lines, a plurality of data lines, and a plurality of gate lines, and at least a part of the data lines overlap with the common electrode and/or the common electrode line. The plurality of data lines are divided into at least two groups. The driving method includes: starting to supply, to the data lines in different groups, data signals corresponding to a gate line at different time points after the gate line is enabled.

12 Claims, 3 Drawing Sheets

(51) Int. Cl.
*G02F 1/1345* (2006.01)
*G02F 1/1362* (2006.01)
*G09G 3/36* (2006.01)

(52) U.S. Cl.
CPC ..... *G02F 1/136286* (2013.01); *G09G 3/3648* (2013.01); *G02F 2201/121* (2013.01); *G09G 2320/0209* (2013.01)

(58) Field of Classification Search
USPC .......................................................... 345/92
See application file for complete search history.

(56) References Cited

U.S. PATENT DOCUMENTS

| | | | |
|---|---|---|---|
| 7,176,875 | B2 | 2/2007 | Nagata et al. |
| 2007/0091044 | A1 | 4/2007 | Park et al. |
| 2007/0164954 | A1* | 7/2007 | Yang .................... G09G 3/3677 345/88 |
| 2009/0002355 | A1 | 1/2009 | Iwatsu |
| 2009/0213054 | A1* | 8/2009 | Masui .................. G02F 1/1345 345/88 |

FOREIGN PATENT DOCUMENTS

| | | |
|---|---|---|
| CN | 102856321 A | 1/2013 |
| CN | 103280195 A | 9/2013 |
| CN | 104934004 A | 9/2015 |
| EP | 1688906 A2 | 8/2006 |
| JP | 2006119581 A | 5/2006 |

OTHER PUBLICATIONS

Second Office Action dated May 27, 2017 corresponding to Chinese application No. 201510379431.8.
Written Opinion of the International Searching Authority dated Oct. 9, 2016 corresponding to International application No. PCT/CN2016/087271.
International Search Report dated Oct. 9, 2016 corresponding to International application No. PCT/CN2016/087271.
The Extended European Search Report dated Nov. 23, 2018 corresponding to application No. 16817218.7-1210.

* cited by examiner

--Prior Art--

LIQUID CRYSTAL DISPLAY PANEL AND DRIVING METHOD THEREOF

This is a National Phase Application filed under 35 U.S.C. 371 as a national stage of PCT/CN2016/087271, filed Jun. 27, 2016, an application claiming the benefit of Chinese Application No. 201510379431.8, filed Jul. 1, 2015, the content of each of which is hereby incorporated by reference in its entirety.

TECHNICAL FIELD

The present invention relates to the field of liquid crystal display technology, and particularly relates to a liquid crystal display panel and a driving method thereof.

BACKGROUND

A liquid crystal display panel includes a plurality of gate lines and a plurality of data lines intersecting with each other, a common electrode and a common electrode line. As shown in FIG. 1, when one gate line is enabled (i.e., a signal capable of turning on a thin film transistor starts to be introduced into the gate line), every data line starts to be supplied with a data signal corresponding to the gate line, so as to cause each sub pixel connected to the gate line to display a predetermined content.

In the liquid crystal display panel, because the data lines partially overlap with the common electrode, the common electrode line, etc., the signals in the data lines may influence a signal on the common electrode (i.e., a common voltage). According to an existing driving method, when one gate line is enabled, all data lines are supplied with data signals at the same time, i.e., signals in all of the data lines are changed at the same time, changes of the signals in the data lines will lead to big noise in the common electrode, which causes wide fluctuation of the common voltage and impacts display, and this problem is called as crosstalk. Especially, crosstalk becomes more and more serious as driving frequency increases.

SUMMARY

In view of the problem that signals of data lines may cause crosstalk to a common voltage in an existing liquid crystal display panel, embodiments of the present invention provide a liquid crystal display panel and a driving method thereof that may avoid crosstalk.

According to an aspect of the present invention, there is provided a driving method of a liquid crystal display panel, the liquid crystal display panel including a common electrode, a common electrode line, a plurality of data lines, and a plurality of gate lines, at least a part of the data lines overlapping with the common electrode and/or the common electrode line, wherein the plurality of data lines are divided into at least two groups, and the driving method includes a step of:

starting to supply, to the data lines in different groups, data signals corresponding to a gate line at different time points after the gate line is enabled.

Optionally, the data lines are divided into two groups including a first group and a second group, the first group includes a plurality of first data lines, the second group includes a plurality of second data lines, and the step of starting to supply, to the data lines in different groups, data signals corresponding to a gate line at different time points after the gate line is enabled includes: starting to supply, to the plurality of first data lines, data signals corresponding to the gate line at a first time point after the gate line is enabled; and starting to supply, to the plurality of second data lines, data signals corresponding to the gate line at a second time point which is later than the first time point by a first delay time.

Optionally, the first delay time is smaller than or equal to 3/16 of a difference between a time point at which the gate line starts to be enabled and a time point at which a next gate line starts to be enabled.

Optionally, the step of starting to supply, to the plurality of first data lines, data signals corresponding to the gate line at a first time point after the gate line is enabled includes: starting to supply, to the plurality of first data lines, the data signals corresponding to the gate line at the first time point which is later than the time point at which the gate line is enabled by a second delay time.

Optionally, a ratio of the number of the first data lines to the number of the second data lines is in the range of 1:3 to 3:1.

Optionally, the gate line has a signal input terminal; the liquid crystal display panel includes a first area and a second area, the second area being farther away from the signal input terminal of each gate line than the first area, the first data lines are in the first area, and the second data lines are in the second area.

Optionally, the signal input terminals of the gate lines are arranged at two opposite sides of the liquid crystal display panel, two areas respectively close to the two opposite sides are set to be two first areas, and an area between the two first areas is set to be the second area.

According to another aspect of the present invention, there is provided a liquid crystal display panel, including a common electrode, a common electrode line, a plurality of data lines, and a plurality of gate lines, at least a part of the data lines overlapping with the common electrode and/or the common electrode line, wherein the plurality of data lines are divided into at least two groups, and the liquid crystal display panel further includes:

a driving unit, which is used for starting to supply, to the data lines in different groups, data signals corresponding to a gate line at different time points after the gate line is enabled.

According to the liquid crystal display panel and the driving method thereof of the present invention, after one gate line is enabled, supply of data signals to all of the data lines does not start at the same time, but at two or more different time points, that is, signals of the data lines are changed at different time points. Therefore, change of the common voltage caused by changes of signals in the data lines is dispersed into changes at different time points, and thus the change of the common voltage at any time point is small. As a result, crosstalk can be alleviated or avoided, and display effect is improved.

DETAILED DESCRIPTION

In order to enable those skilled in the art to better understand the technical solutions of the present invention, the present invention will be described in detail below in conjunction with accompanying drawings and specific implementations.

First Embodiment

Figure 1:
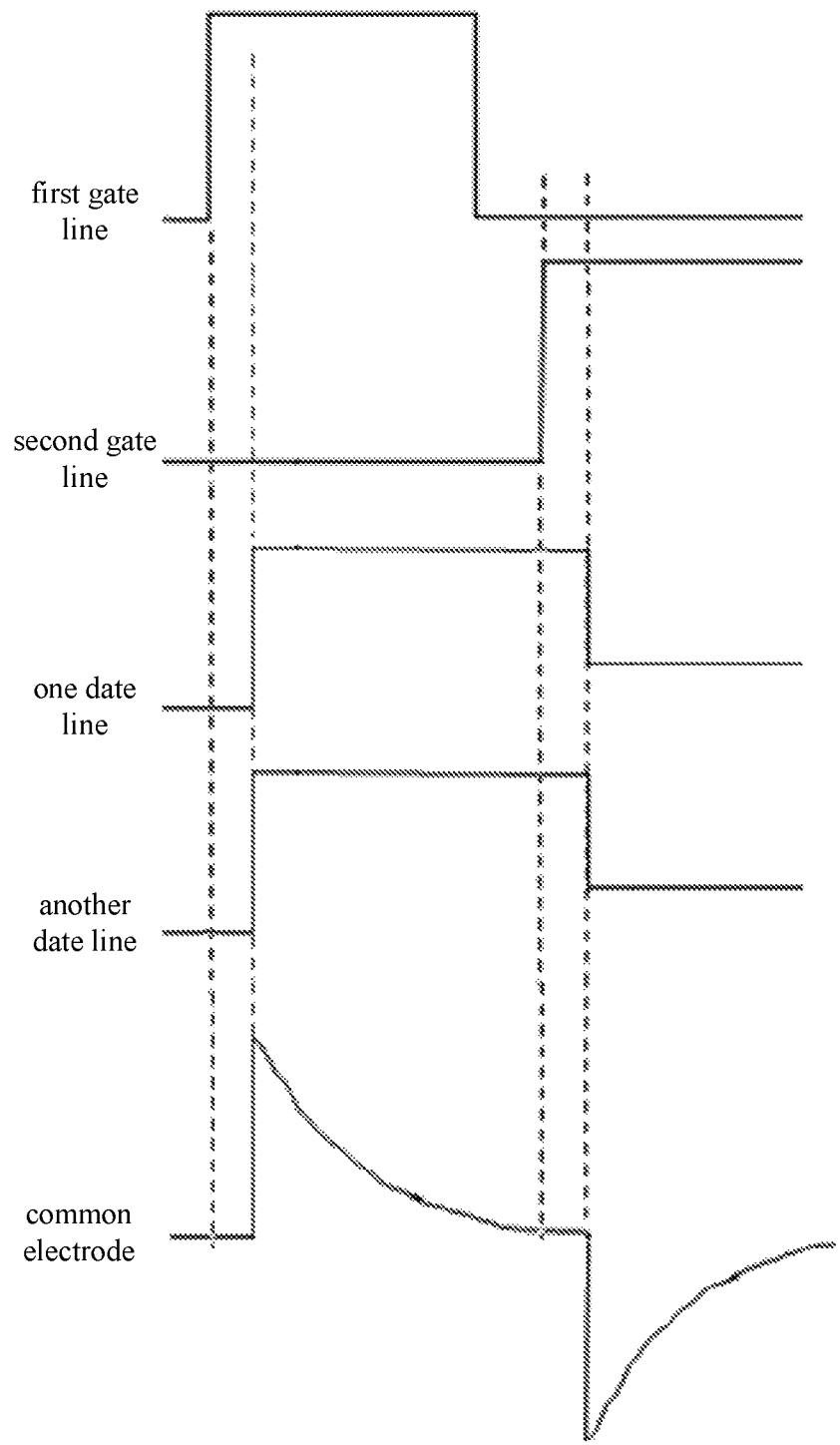
FIG. 1 is a timing diagram of an existing driving method of a liquid crystal display panel.
Figure 2:
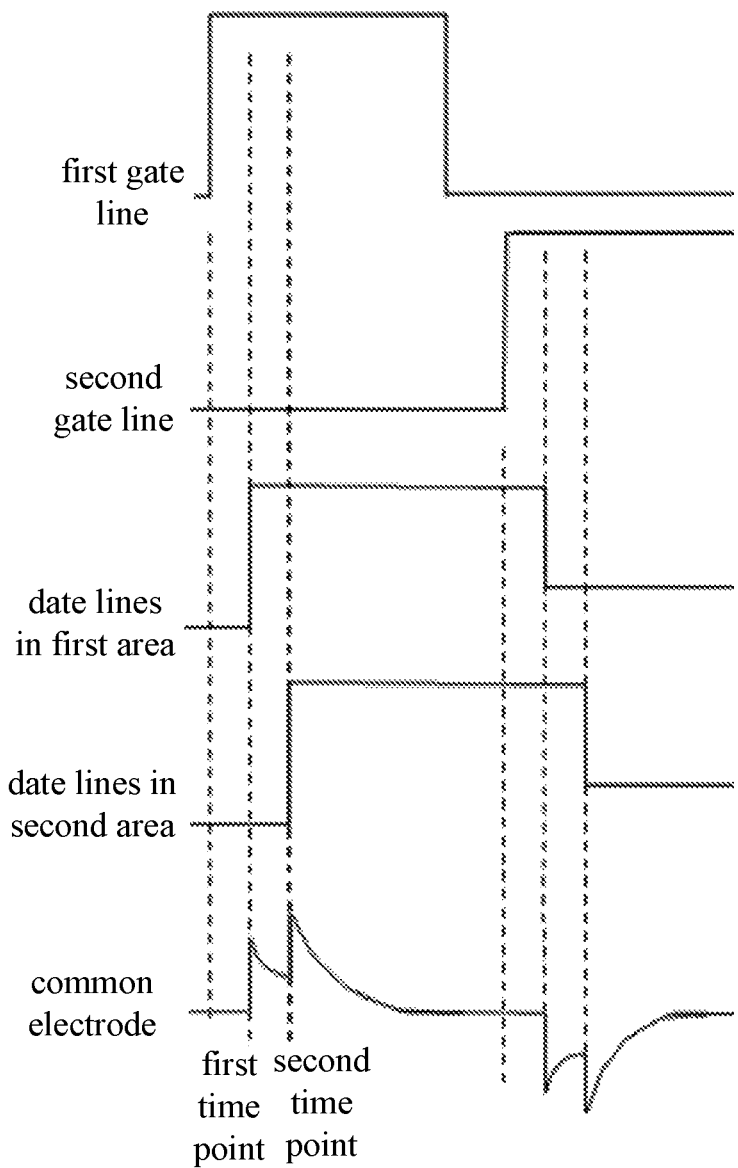
FIG. 2 is a schematic timing diagram of a driving method of a liquid crystal display panel according to an embodiment of the present invention.
Figure 3:
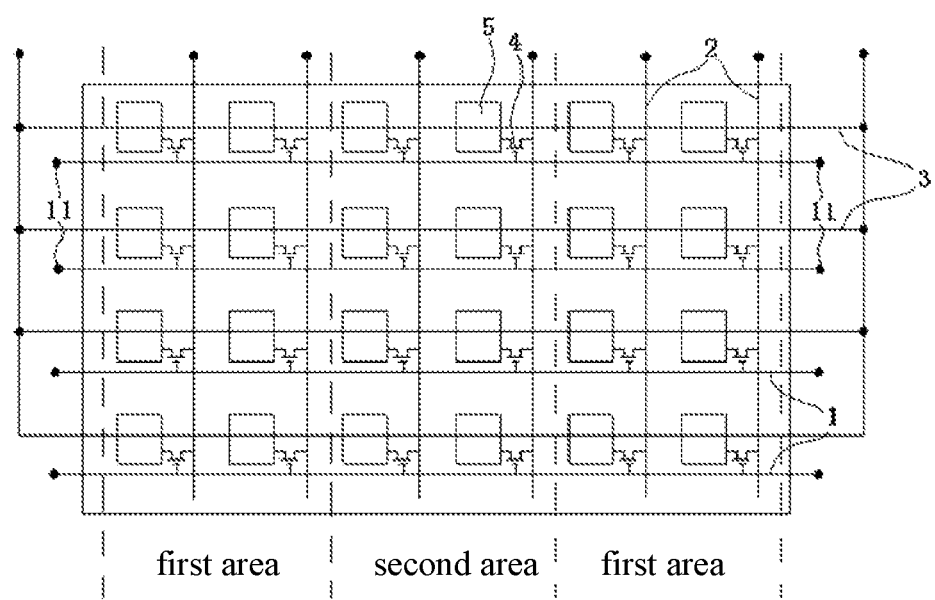
FIG. 3 is a schematic diagram illustrating exemplary distribution of lead wires in a liquid crystal display panel of an embodiment of the present invention.

As shown in FIGS. 2 and 3, the embodiment provides a driving method of a liquid crystal display panel. The liquid crystal display panel includes a common electrode (not shown), a common electrode line 3, a plurality of data lines 2, and a plurality of gate lines 1, and an overlapping portion exists between at least a part of the data lines 2 and the common electrode and/or the common electrode line 3. The plurality of data lines 2 are divided into at least two groups.

The liquid crystal display panel may be formed by an array substrate and a color filter substrate that are aligned and assembled with each other. As shown in FIG. 3, the array substrate includes gate lines 1 and data lines 2 intersecting with each other, and a thin film transistor 4 is provided at an intersection of a gate line 1 and a data line 2 to control a pixel electrode 5 of a corresponding sub-pixel. In the meanwhile, the liquid crystal display panel also includes a common electrode and a common electrode line 3 for providing a signal to the common electrode. The common electrode line 3 is generally provided in the array substrate, and the common electrode may also be provided in the array substrate or may be provided in the color filter substrate. However, no matter how the common electrode line 3 and the common electrode are arranged, at least a part of the data lines 2 overlap with (but are insulated from) the common electrode and/or the common electrode line 3.

The driving method of a liquid crystal display panel of the embodiment includes a step of:

starting to supply, to data lines in different groups, data signals corresponding to one gate line 1 at different time points after the gate line 1 is enabled.

That is to say, according to the driving method of the present embodiment, after one gate line 1 is enabled, supply of corresponding data signals to all of the data lines 2 does not start at the same time, but at two or more different time points, that is, signals in the data lines 2 are changed at different time points. Therefore, change of the common voltage caused by changes of signals in the data lines 2 is dispersed into changes at different time points, and thus the change of the common voltage at any time point is small. As a result, crosstalk can be alleviated or avoided, and display effect is improved.

Optionally, the data lines 2 are divided into two groups, the first group includes a plurality of first data lines 2, and the second group includes a plurality of second data lines 2. In this case, the above step of the driving method of the embodiment may include:

starting to supply, to the plurality of first data lines 2, data signals corresponding to one gate line 1 at a first time point after the gate line 1 is enabled; and starting to supply, to the plurality of second data lines 2, data signals corresponding to the gate line 1 at a second time point which is later than the first time point by a first delay time. Here, the first delay time is preferably smaller than or equal to 3/16 of a difference between a time point at which the gate line 1 starts to be enabled and a time point at which a next gate line 1 starts to be enabled.

That is to say, in theory, the data lines 2 may be divided into a lot of groups, and supply of signals to different groups may start at different time points, but in this case, the control is complicated and it is difficult to implement. It was found out that crosstalk can be alleviated adequately in a case where the data lines 2 are divided into two groups only and supply of signals to the two groups respectively begins at two different time points. Therefore, the data lines 2 may be divided into two groups as above. Difference between time points when the two groups of data lines 2 start to be supplied with signals is the first delay time. Obviously, the first delay time cannot be too long, otherwise there is not enough time for the second data lines 2 to complete charge of sub-pixels. It was found that, it is appropriate that the first delay time is below 3/16 of a cycle of the gate lines.

Further preferably, the first time point arrives when second delay time elapses from the time point at which one gate line 1 is enabled, and the first data lines 2 start to be supplied with the data signals corresponding to the gate line 1 at the first time point.

That is to say, when the gate line 1 is enabled, preferably supply of signals to the first data lines 2 starts after a period of delay. This is because every thin film transistor 4 connected to the gate line 1 needs certain time to be turned on completely, there is an inevitable error in the time when signals are supplied, and thus display effect can be ensured by starting to supply signals to the first data lines 1 when a period of time elapses from the time point when the gate line 1 is enabled. Specific duration of the second delay time may be set as required, and for example, may be set to be below 3/16 of the cycle of gate lines. Because the duration of the second delay time may be a duration usually adopted in the prior art, it is not described in detail herein.

Preferably, a ratio of the number of the first data lines 2 to the number of the second data lines 2 is in the range of 1:3 to 3:1.

Obviously, there should be a certain ratio between the numbers of the two groups of data lines 2 (the first data lines 2 and the second data lines 2), and the effect of alleviating crosstalk cannot be achieved if the number of the data lines 2 in one group is too small. It was found that the number of the data lines 2 in one group preferably accounts for 1/4 to 3/4 of the total number of all of the data lines 2.

Preferably, the gate line 1 has a signal input terminal 11, and the liquid crystal display panel is divided into a first area and a second area, the second area being farther away from the signal input terminals 11 of the gate lines 1 than the first area. The first data lines 2 are in the first area, and the second data lines 2 are in the second area. In a specific example, the signal input terminal 11 of each gate line 1 is arranged at two opposite sides of the liquid crystal display panel, two areas adjacent to the two opposite sides are set to be two first areas, and an area between the two first areas is set to be the second area.

That is to say, preferably, the first data lines 2 that are supplied with signals earlier are closer to the signal input terminals 11 of the gate lines 1 than the second data lines 2 that are supplied with signals later. Specifically, for the arrangement in which signals are introduced from both ends of the gate line 1, two sides of the display panel are provided with the signal input terminals 11, accordingly, the first data lines 2 are arranged at the two sides of the liquid crystal display panel, and the second data lines 2 are arranged in the middle portion of the liquid crystal display panel. The reason for using such arrangement is that signal delay exists in the gate line 1, that is, when a signal is introduced into the gate line 1, the farther a position is away from the signal input terminal 11, the later the signal actually arrives at the position, and therefore, there is no need to supply a corresponding data signal to a data line 2 at such a position early, and the influence on gate timing margin can be avoided by adopting the above arrangement.

Needless to say, the above manner of dividing the liquid crystal display panel does not constitute a limitation to the present invention, it is only required that the data lines 2 close to the signal input terminals 11 of the gate lines 1 are supplied with data signals early. For example, if signal input terminals 11 of the gate lines 1 are positioned at only one side (e.g., left side) of the display panel, a part of the data lines 2 (accounting for ¼ to ¾ of the total number of the data lines 2) close to the left side of the display panel may serve as the first data lines 2, and the remaining data lines 2 serve as the second data lines 2. Alternatively, the data lines may be divided into more groups. For example, ⅓ of the data lines on the left side serve as the first data lines 2, ⅓ of the data lines in the middle serve as the second data lines 2, and ⅓ of the data lines on the right side serve as the third data lines 3, wherein the second data lines 2 start to be supplied with data signals later than the first data lines 2, and the third data lines 2 start to be supplied with data signals later than the second data lines 2.

Second Embodiment

This embodiment provides a liquid crystal display panel that can implement the above driving method, and includes a common electrode, a common electrode line, a plurality of data lines, and a plurality of gate lines, at least a part of the data lines overlapping with the common electrode and/or the common electrode line, wherein the plurality of data lines are divided into at least two groups, and the liquid crystal display panel further includes:

a driving unit, which is used for starting to supply, to data lines in different groups, data signals corresponding to a gate line at different time points after the gate line is enabled.

Preferably, the data lines are divided into two groups, the first group includes a plurality of first data lines, and the second group includes a plurality of second data lines. The driving unit is used for starting to supply, to the plurality of first data lines, data signals corresponding to the gate line at a first time point after the gate line is enabled; and starting to supply, to the plurality of second data lines, data signals corresponding to the gate line at a second time point which is later than the first time point by a first delay time.

Like the first embodiment, in this embodiment, the first delay time may be smaller than or equal to 3/16 of a difference between a time point at which the gate line starts to be enabled and a time point at which a next gate line starts to be enabled. A ratio between the number of the first data lines and the number of the second data lines may be in the range of 1:3 to 3:1.

The driving unit may start to supply, to the plurality of first data lines, the data signals corresponding to the gate line at the first time point which is later than the time point at which the gate line is enabled by a second delay time.

Each gate line has a signal input terminal. The liquid crystal display panel may be divided into a first area and a second area, and the second area is farther away from the signal input terminals of the gate lines than the first area. The first data lines are in the first area, and the second data lines are in the second area.

In a specific example, the signal input terminal of each gate line is arranged at two opposite sides of the liquid crystal display panel, two areas respectively close to the two opposite sides are set to be the first areas, and an area between the two first areas is set to be the second area.

It can be understood that, the above implementations are merely exemplary implementations used for explaining the principle of the present invention, but the present invention is not limited thereto. For those skilled in the art, various modifications and improvements may be made without departing from the spirit and essence of the present invention, and these modifications and improvements are also deemed as falling within the protection scope of the present invention.

What is claimed is:

1. A driving method of a liquid crystal display panel, the liquid crystal display panel comprising a common electrode, a common electrode line, a plurality of data lines, and a plurality of gate lines, at least a part of the data lines overlapping with the common electrode and/or the common electrode line, wherein the plurality of data lines are divided into two groups including a first group and a second group each comprising at least one set consisting of a plurality of adjacent data lines, the first group comprises a plurality of first data lines, the second group comprises a plurality of second data lines, the plurality of gate lines have signal input terminals, the signal input terminals of the plurality of gate lines are arrange at two opposite sides of the liquid crystal display panel, the liquid crystal display panel comprises first areas and a second area, two areas respectively close to the two opposite sides are set to be the first areas, an area between the two first areas is set to be the second area, the first data lines are in the first area, the second data lines are in the second area, and the driving method comprises a step of:

starting to supply, to the data lines in different groups, data signals corresponding to a gate line at different time points after the gate line is enabled.

2. The driving method of a liquid crystal display panel of claim 1, wherein the step of starting to supply, to the data lines in different groups, data signals corresponding to a gate line at different time points after the gate line is enabled comprises:

starting to supply, to the plurality of first data lines, data signals corresponding to the gate line at a first time point after the gate line is enabled; and starting to supply, to the plurality of second data lines, data signals corresponding to the gate line at a second time point which is later than the first time point by a first delay time.

3. The driving method of a liquid crystal display panel of claim 2, wherein the first delay time is smaller than or equal to 3/16 of a difference between a time point at which the gate line starts to be enabled and a time point at which a next gate line starts to be enabled.

4. The driving method of a liquid crystal display panel of claim 2, wherein the step of starting to supply, to the plurality of first data lines, data signals corresponding to the gate line at a first time point after the gate line is enabled comprises:

starting to supply, to the plurality of first data lines, the data signals corresponding to the gate line at the first time point which is later than the time point at which the gate line is enabled by a second delay time.

5. The driving method of a liquid crystal display panel of claim 2, wherein a ratio of the number of the first data lines to the number of the second data lines is in the range of 1:3 to 3:1.

6. The driving method of a liquid crystal display panel of claim 2, wherein the second area is farther away from the signal input terminal of each gate line than the first area.

7. A liquid crystal display panel, comprising a common electrode, a common electrode line, a plurality of data lines, and a plurality of gate lines, at least a part of the data lines overlapping with the common electrode and/or the common electrode line, wherein the plurality of data lines are divided into two groups including a first group and a second group each comprising at least one set consisting of a plurality of adjacent data lines, the first group comprises a plurality of first data lines, the second group comprises a plurality of second data lines, the plurality of gate lines have signal input terminals, the signal input terminals of the plurality of gate lines are arranged at two opposite sides of the liquid crystal display panel, the liquid crystal display panel comprises first areas and a second area, two areas respectively close to the two opposite sides are set to be the first areas, an area between the two first areas is set to be the second area, the first data lines are in the first area, the second data lines are in the second area, and the liquid crystal display panel further comprises:

a driving unit, which is used for starting to supply, to the data lines in different groups, data signals corresponding to a gate line at different time points after the gate line is enabled.

8. The liquid crystal display panel of claim 7, wherein the driving unit is used for starting to supply, to the plurality of first data lines, data signals corresponding to the gate line at a first time point after the gate line is enabled; and starting to supply, to the plurality of second data lines, data signals corresponding to the gate line at a second time point which is later than the first time point by a first delay time.

9. The liquid crystal display panel of claim 8, wherein, the first delay time is smaller than or equal to 3/16 of a difference between a time point at which the gate line starts to be enabled and a time point at which a next gate line starts to be enabled.

10. The liquid crystal display panel of claim 8, wherein the driving unit is used for starting to supply, to the plurality of first data lines, the data signals corresponding to the gate line at the first time point which is later than the time point at which the gate line is enabled by a second delay time.

11. The liquid crystal display panel of claim 8, wherein, a ratio between the number of the first data lines and the number of the second data lines is in the range of 1:3 to 3:1.

12. The liquid crystal display panel of claim 8, wherein the second area is farther away from the signal input terminals of the gate lines than the first area.

* * * * *